United States Patent [19]

Elford et al.

[11] 4,356,045

[45] Oct. 26, 1982

[54] COMPLETE PRODUCTION LINE OF WOOD I-JOIST MANUFACTURING APPARATUS THE METHOD OF MANUFACTURE, AND THE I-JOIST PRODUCT, HAVING LUMBER CHORDS AND A PLYWOOD WEB

[75] Inventors: William J. Elford, Auburn; Donald E. Williams; Keith H. Miller, both of Tacoma, all of Wash.

[73] Assignee: St. Regis Paper Company, Tacoma, Wash.

[21] Appl. No.: 154,916

[22] Filed: May 30, 1980

[51] Int. Cl.[3] .......................... B27D 1/10; B32B 31/18

[52] U.S. Cl. .......................................... 156/64; 144/3 M; 144/136 R; 156/258; 156/516; 156/517; 156/257; 156/379.8; 156/273.5; 156/275.5; 156/275.7; 156/272.2; 156/353; 144/346; 144/355

[58] Field of Search ............... 156/257, 258, 273, 516, 156/517, 64, 272.2, 273.5, 275.5, 275.7, 353, 379.8; 52/729; 144/3 R, 3 M, 136 R, 315 R, 315 A, 317, 319

[56] References Cited

U.S. PATENT DOCUMENTS

| | | | |
|---|---|---|---|
| 1,572,247 | 2/1926 | Rockwell | 144/315 R |
| 3,126,308 | 3/1964 | Brockerman et al. | 144/315 R |
| 3,477,485 | 11/1969 | Talbutt | 144/319 |
| 3,616,091 | 10/1971 | Troutner | 144/315 R |
| 3,894,908 | 7/1975 | Troutner et al. | 156/258 |
| 4,128,119 | 12/1978 | Maier | 156/258 |

*Primary Examiner*—Caleb Weston

*Attorney, Agent, or Firm*—Roy E. Mattern, Jr.; Kenneth S. Kessler

[57] ABSTRACT

A complete production line of a wood I-joist manufacturing apparatus, the method of manufacture, and the I-joist products having lumber chords and a plywood web are available, wherein both the chord lumber and the web plywood are initially made into essentially endless lengths for subsequent cutting to lengths of the then pre-specified sizes of I-joists being prepared. Smaller lengths of chord lumber are finger jointed and glue cured together into longer lengths, which are then cut to specified overall lengths. Thereafter they are grooved to receive the opposing cut side edges of the web. Then these cut interfitting surfaces of both the chord lengths and the web first receive an application of glue before their subsequent convenient conveyed, converging, assembly. Once assembled, their overall glued joints enter a radio frequency heating glue curer which insures an excellent attachment between the chords and the web. The web is then cut to match the length of the chords. Thereafter glued attachment strength in resulting I-joist configuration can be tested at the end of the production line.

18 Claims, 37 Drawing Figures

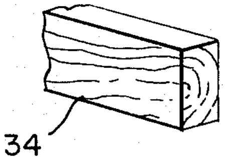
FIG. 5
FIG. 6
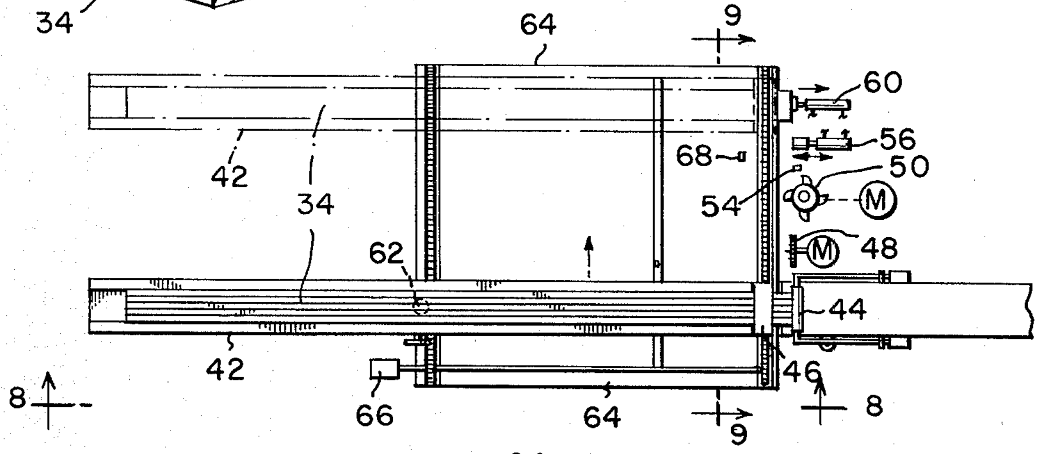
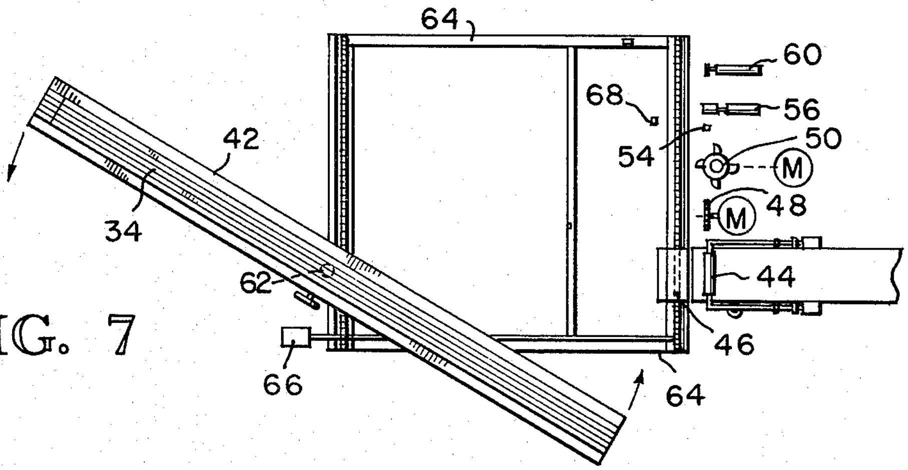
FIG. 7
FIG. 8
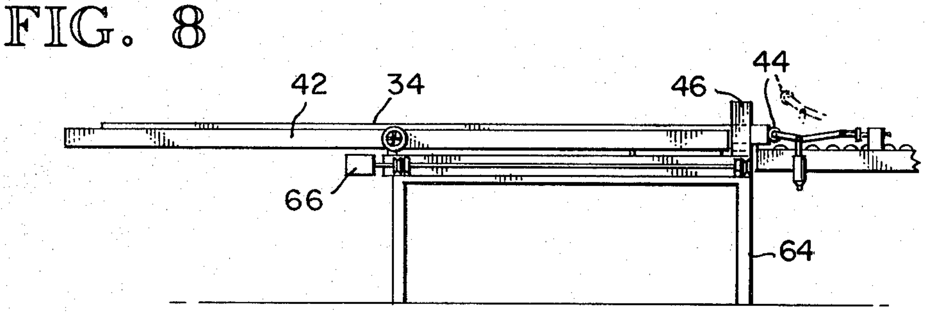
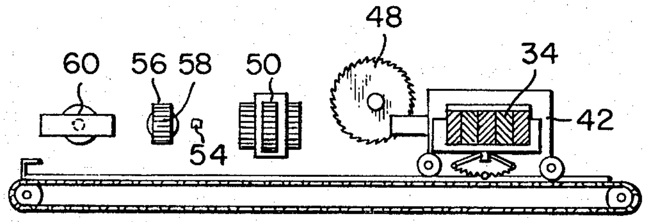
FIG. 9

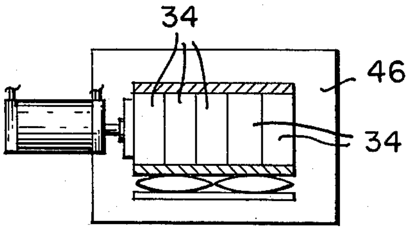
FIG. 10
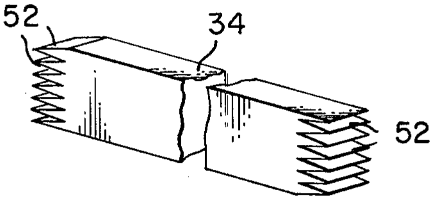
FIG. 11
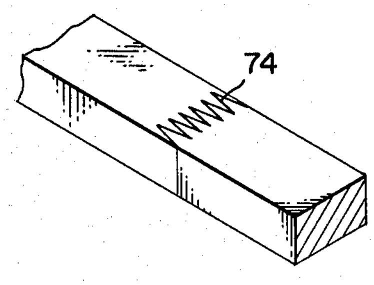
FIG. 12
FIG. 13
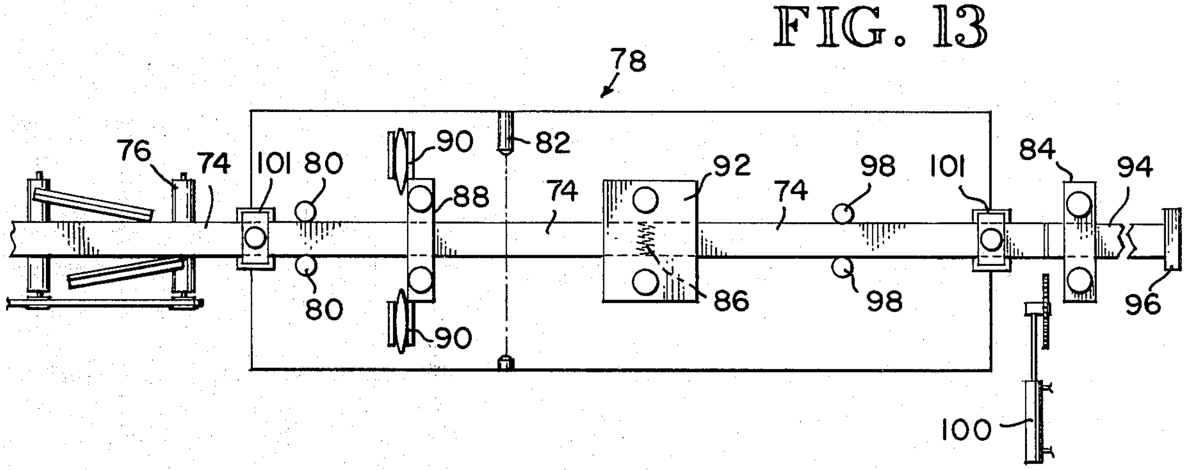
FIG. 14
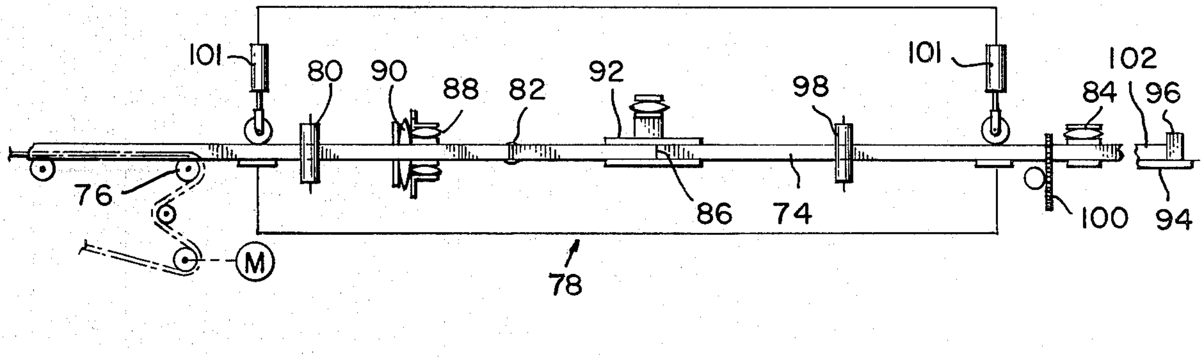

FIG. 15
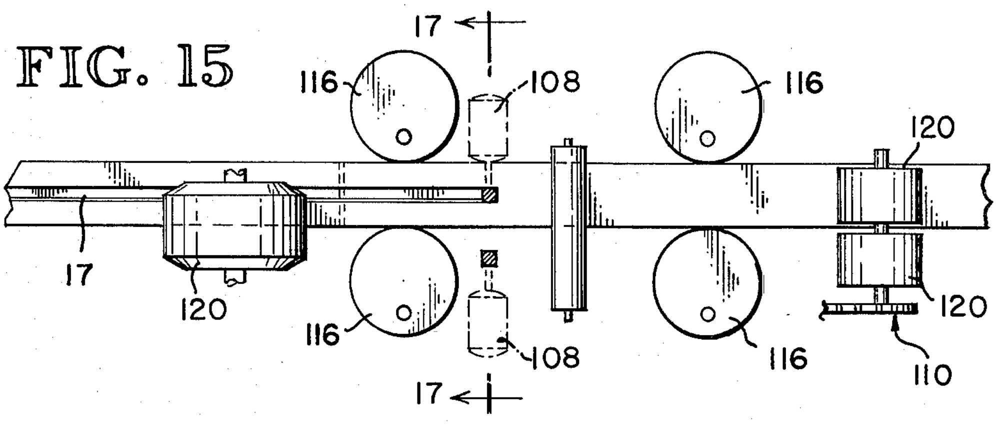
FIG. 16
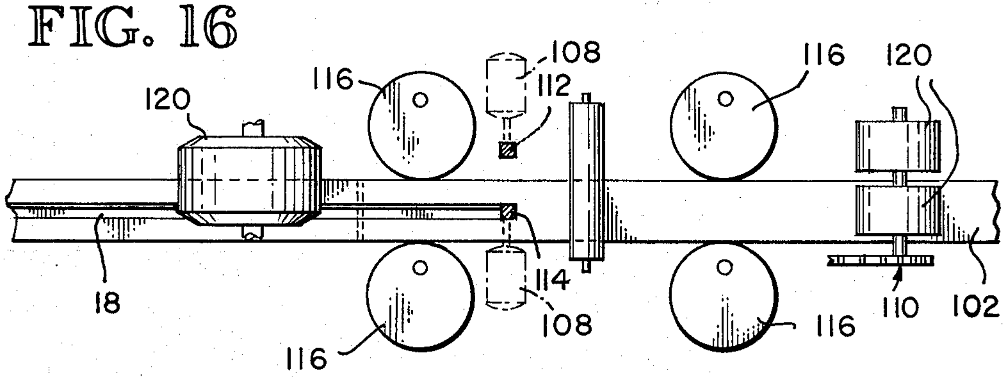
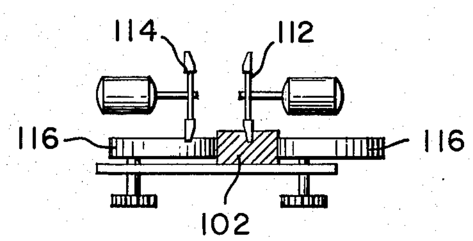
FIG. 17
FIG. 18
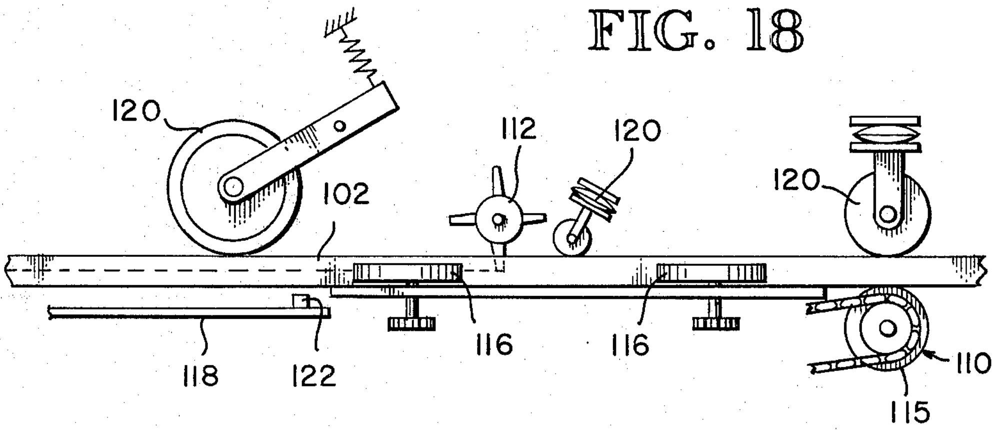
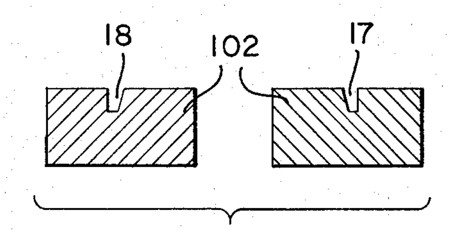
FIG. 19

FIG. 25
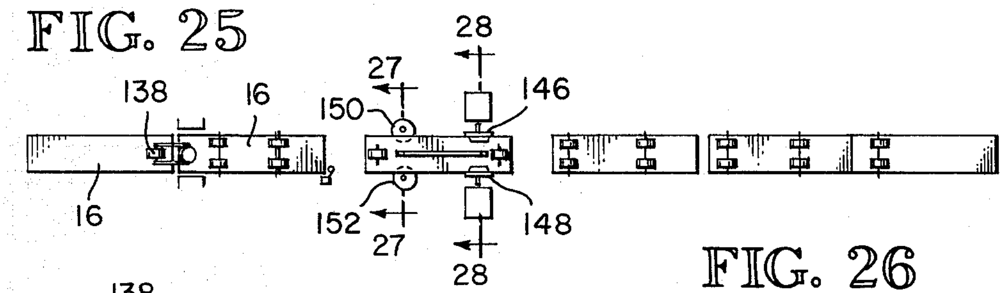
FIG. 26
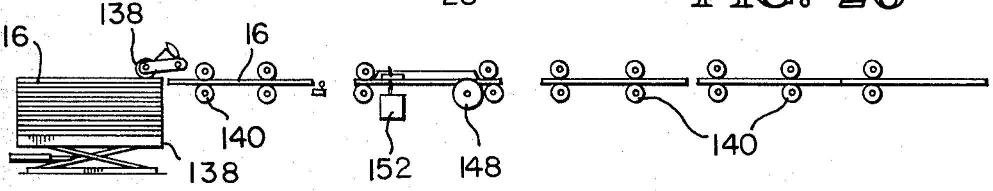
FIG. 27
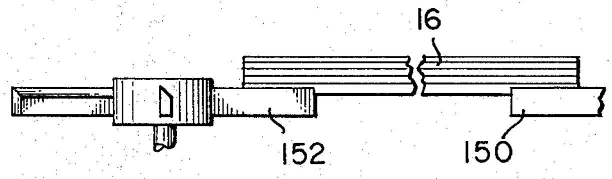
FIG. 28
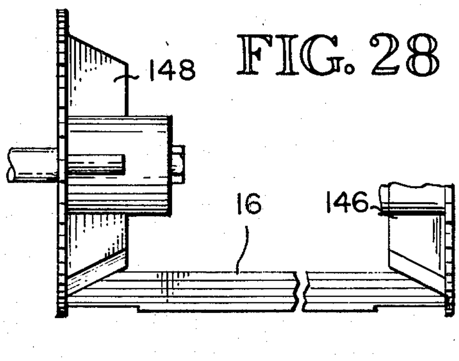
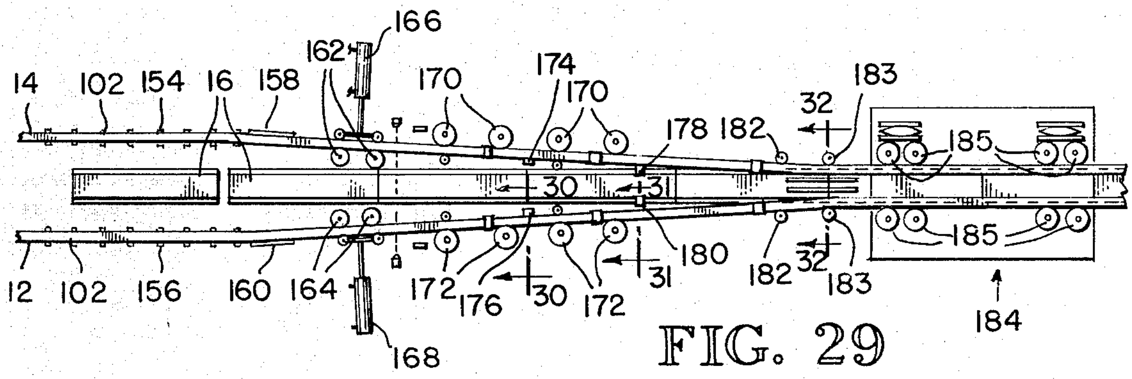
FIG. 29
FIG. 30
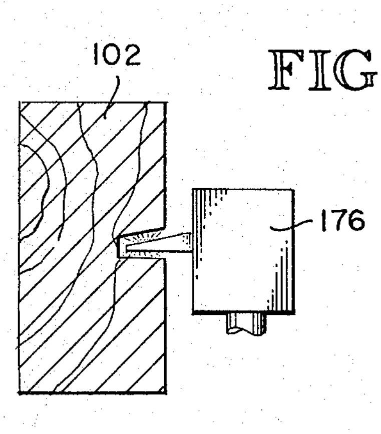
FIG. 31
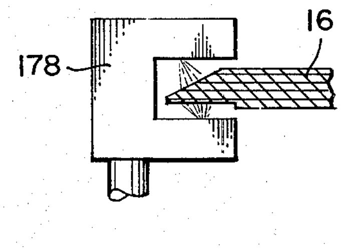

FIG. 36
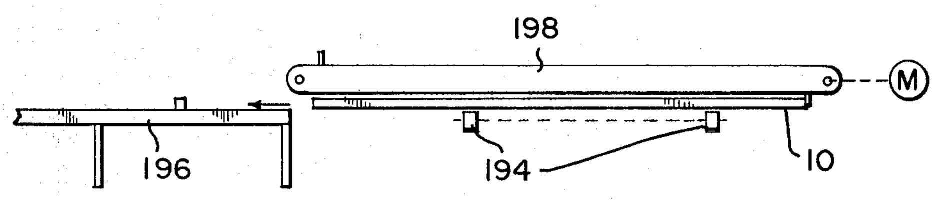
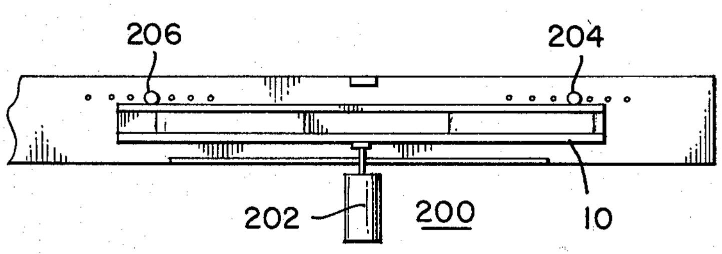
FIG. 37

COMPLETE PRODUCTION LINE OF WOOD I-JOIST MANUFACTURING APPARATUS THE METHOD OF MANUFACTURE, AND THE I-JOIST PRODUCT, HAVING LUMBER CHORDS AND A PLYWOOD WEB

BACKGROUND OF THE INVENTION

Wood I-joists made of lumber chords or laminated chords and plywood webs, have been previously made and used in construction. Also there are patents describing and illustrating them, their method of manufacture and the apparatus for manufacturing them, such as:

In U.S. Pat. No. 1,377,891 by E. V. Knight is disclosed his construction requiring the use of either a dovetail groove and tongue, or a rabbet joint to secure the web to the chords of the I-joist;

In U.S. Pat. No. 3,477,485 by J. W. Talbott is disclosed a series of rollers used to slightly open up rectangular grooves in the chords to receive the inserted web into these grooves. After the insertion of the web the widening forces are released and the groove narrows maintaining the necessary joint pressure for good contact while the glue is cured and also thereafter; and In U.S. Pat. Nos. 3,616,091 and 3,894,908 of Arthur L. Troutner is disclosed the slight crushing of the sides of the insertable portions of a web before their insertion into the grooves of respective chords. The moisture in the applied glue subsequently caused the crushed sides to attempt to expand to their previous uncrushed dimensions. Such attempted expansion of these web portions inserted into these grooves thereby provided the necessary pressure to assure sufficient contact for the glue to cure very well between the chords and web of his wood I-joists.

SUMMARY OF THE INVENTION

A complete production line of wood I-joist manufacturing apparatus, the method of manufacture, and an I-joist product, having lumber chords and a plywood web are all available to provide such I-joists of varying lengths and widths. Odd lengths of standard cross-sectional lumber are made selectively into chords up to 60 feet in length or less, by creating glued multi-fingered joints between shorter lengths of lumber to create in effect endless lumber for chords. During a specified production run, after the ultimate chord lengths are pre-determined, and the endless lumber is under production, inclusive of immediate high energy radio frequency glue curing of the glued finger joints, then chord lengths are cut. Thereafter the cut chord lumber pieces are directed through a groove cutter, and subsequently successive chords are positioned with their grooves facing one another and conveyed into converging paths about crowded edge to edge plywood web pieces, previously having had their edges cut for insertion into the grooves.

The glue is introduced into the chord grooves and also placed in the insertable web edges and thereafter, the convergence is continued so the chord grooves are directed into an interfitting position with the inserted web edges. Then the assembled chords and web are passed into a high energy radio frequency glue curing apparatus capable of curing the glue, while the assembled chords and web are travelling on a conveyor at a speed of approximately thirty feet per minute.

The webs are introduced without regard to then selected length of the chords, to in effect constitute a continuous web. Thereafter a web cutting saw is controlled to cut the continuous web between the pairs of leading and following chords to thereby substantially complete the I-joists. With all the joints having their glue bonds constantly being cured via the production line glue curer, using high energy radio frequency, once the I-joist leaves the last glue curer, it is tested, to sustain its intended load capacity. If an I-joist fails its test, operators may quickly work on various aspects of the production line apparatus to correct any possible production flaws, and quickly maintain production, under this high level of quality control.

DESCRIPTION OF THE DRAWINGS

The preferred embodiments of the wood I-joist product having lumber chords and plywood web, and the complete production line of the wood joist manufacturing apparatus are illustrated in the drawings, wherein:

FIG. 5 is a perspective view of the chord lumber generally 2×4 inch lumber as introduced into the commencement of the production line;

FIG. 6 is a schematic top view of the apparatus used to prepare the chord lumber for joining into an endless chord wherein the following steps are undertaken: trimming ends, finger cutting, applying glue, and inking;

FIG. 7 is a schematic top view of the apparatus, like FIG. 6, illustrating the operation of the included turntable conveyor changing the chord lumber end for end and thereafter trimming, finger cutting, and applying glue to the turned ends;

FIG. 8 is a side view of the apparatus used to prepare the chord lumber for joining into an endless chord;

FIG. 9 is a schematic side view of the apparatus used to prepare the chord lumber for joining taken along line 9—9 illustrating the process of trimming, finger cutting, and gluing.

FIG. 10 is a side view of the hydraulic press holding chord lumber which is ready for preparation for joining into an endless chord;

FIG. 11 is a perspective view of portions of the chord lumber where there is a completed finger joint;

FIG. 12 is a perspective view of the two finger jointed 2×4's attached;

FIG. 13 is an overhead schematic view of the mechanical finger jointing and glue curing assembly;

FIG. 14 is a side schematic view of the mechanical finger jointing and glue curing assembly;

FIG. 15 is a schematic top view of the mechanism used to cut grooves in the specified selectable chord lengths, in respective ways to create top and bottom chords, illustrating the two separate groove cutters on their drive shafts;

FIG. 16 is also a schematic top view of the mechanism used to cut grooves in the chords, illustrating a second chord being run through the groove cutter, the chord being cut by the alternate groove cutter;

FIG. 17 is a front view of the two alternating groove cutter knives with the positioning wheels having moved the chord to a position to be cut by one of the alternating groove cutter knives;

FIG. 18 is a schematic side view of the mechanism used to cut grooves in the specified selectable chords further illustrating the outfeed table for receiving the chord after having been processed through the groove cutting mechanism;

FIG. 19 is a cross-sectional view of the alternate grooved chords, illustrating that when the chords face one another, i.e. the top and bottom chords, their grooves are the mirror images of one another;

FIG. 25 is a schematic top view of the mechanisms which trim, taper and forward the web material to its convergence with the chords;

FIG. 26 is a schematic side view of the mechanisms which trim, taper and forward the web material;

FIG. 27 is a cross-sectional side view of the straight edge cutting head with the web passing therethrough;

FIG. 28 is a cross-sectional side view of the web with a bevel forming head and web trim saw bevelling and trimming a side of the web;

FIG. 29 is a schematic top view of the mechanism which starts and completes the convergence of the top and bottom chords about the web and during this operation introduces glues to the chord and web and cures the glued joints with high energy radio frequency;

FIG. 30 is a cross-sectional view of the chord with glue being introduced into the groove through the glue nozzle;

FIG. 31 is a cross-sectional view of the web glue being sprayed on the tapered and straight surfaces of the edge of the web;

FIG. 36 is a sectional side view of the I-joist being forwarded along a conveyor into place for movement by the test placement conveyor to the testing equipment; and FIG. 37 is a schematic top view of the testing mechanism used to test the strength of each manufactured I-joist at the conclusion of the production line.

DESCRIPTION OF PREFERRED EMBODIMENTS

The Preferred Wooden I-Joist

The wooden I-joist of the preferred embodiment is utilized for varying construction purposes, centering on beams to support roofs and floors, and it is produced at varying lengths, web widths, and from different chord sizes and web thicknesses. The specific illustration in FIG. 1 of the wooden I-joist 10 shows 2×4 inch nominal dimension lumber, i.e. $1\frac{1}{2}'' \times 3\frac{1}{2}''$ finger jointed and cut to selectable lengths to make an upper chord 12 and lower chord 14 with a web 16 of $\frac{1}{2}$ inch plywood affixed between them.

Figures 1, 2, 3, 4:
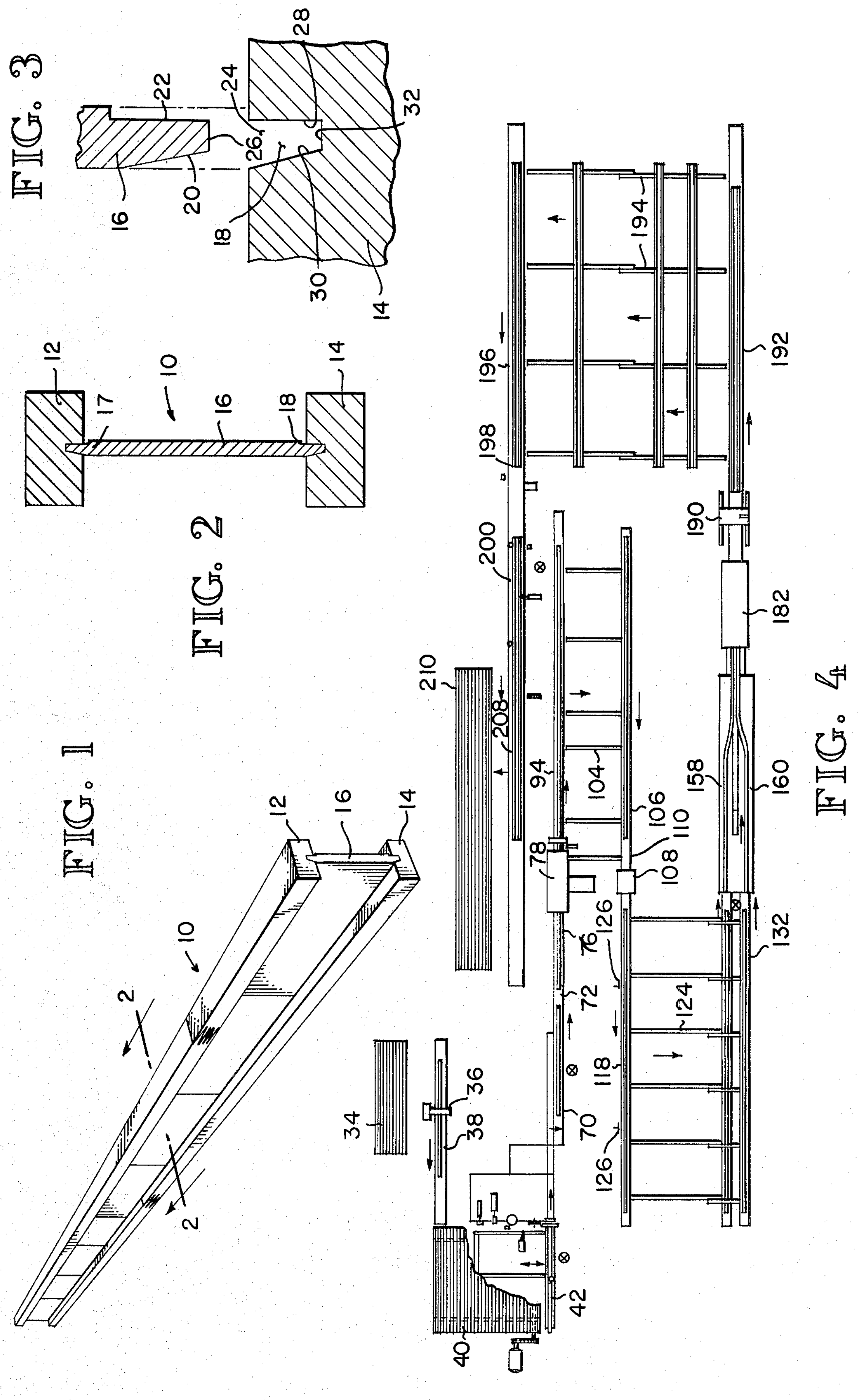
FIG. 1 is a perspective view of the wood I-joist.
FIG. 2 is a cross-sectional view of the wood I-joist taken along section lines 2—2 of FIG. 1.
FIG. 3 is an enlarged partial view of portions of the wood I-joist, i.e. the web and a grooved chord, just before assembly.
FIG. 4 is a schematic top view of a production line of the wood I-joist manufacturing apparatus illustrating one embodiment of the relative positions of the components of the overall apparatus, and also indicating the flow of the chord lumber and web plywood from their introduction through their emergence when joined together as completed wooden I-joists, fully tested and ready for use.

As illustrated in FIGS. 2 and 3, both the upper and lower chords 12 and 14 have respective grooves 17 and 18, both having an initial opening 24, which is wider than the top and bottom leading edges 26 of the web 16. Adjacent these leading edges 26, the web 16 is formed at top and bottom respectively with tapered surfaces 20 on one side and straight surfaces 22 on the other side. The grooves 17 and 18 of the chords 12 and 14 have a straight side 28 and a tapered opposite side 30. The tapered side 30 is angled to provide a wider initial opening 24 at the top of the grooves 17, 18 and a narrower base width 32 at the base of each groove 17, 18. The straight side 28 assures the chord will be perpendicular to the web upon later assembly. The width of the base width 32 on the chords 12, 14, corresponds to the width of the leading edges 26 on the web 16. In this preferred embodiment, the leading edges 26 of web 16 are trimmed to assure a good fit with the base width 32 of the chords 12 and 14. Also the mating straight sides 22 of the webs 16 are trimmed to assure a good fit with the straight sides 28 of grooves 17, 18 of the chords 12 and 14, with these straight surfaces maintaining the perpendicularity of the chords relative to the web.

Also, both the upper and lower tapered web surfaces 20 are designed to easily fit within the chord grooves 17 and 18 as illustrated in FIGS. 2 and 3. In FIG. 3, the surfaces are shown before they are moved together. On the web 16, tapered surfaces 20 slant from the side of the web 16 to the leading edge 26. In this preferred embodiment, the slant or taper is cut at a 10° angle, resulting in the width of a leading edge 26 corresponding to the width of the base width 32, and also corresponding with the tapered sides 30 of the grooves 17 and 18, thereby forming overall integrated joints between the chords 12, 14 and the web 16 of the I-joist 10. On the opposite side of the web 16, is a smooth cut surface 22, having no taper, which is so cut to eliminate any roughness or irregularities appearing on the surface of the web 16 at this joining location, and thereby insure the perpendicularity of the web of the chords. Such irregularities are fairly common in the surfaces of commercial plywood, and should be eliminated to insure the creation of better joints between the chords 12, 14 and web 16. Preferably, the length of these smooth cut surfaces 22 is as long or longer than the depth of the grooves 17 and 18 in the chords 12 and 14.

Upon assembly of the chords 12 and 14 to the web 16, since the leading edges 26 are narrower than the initial openings 24 of the grooves 17 and 18, the beginning of the fitting or joining is easily established. Once begun, the smooth cut surface 22 of the web 16 slides down the straight side 28 of the grooves 17 or 18 in the chords 12 or 14, while the tapered surfaces 20 slide down tapered sides 30 of the grooves 17 or 18 in the chords 12 or 14.

Before their joining, the grooves 17 and 18 of the chords 12, 14 are injected with glue, as are the respective edges 26, the tapered surfaces 20 and the straight sides 22 of the web 16.

As illustrated in FIG. 2, in respect to assembly, when the grooves 17 and 18 face one another, the straight sides 28 of the respective chords 12 and 14, are on the same side, the grooves 17 and 18 being mirror images of one another.

The Preferred Equipment and its Layout for Manufacturing the Preferred Wooden I-Joist In FIG. 4, a schematic diagram is shown of the layout of the various components of the preferred embodiment of the overall equipment, used in manufacturing the wooden joist 10 is illustrated in FIGS. 1, 2 and 3.

Commencing the Making of an Endless Chord, Moisture Detection

In preparing the chords 12, 14, the first step in the process is running commercial 2×4 inch, nominal dimension, cross-sectional wood pieces 34, often of random lengths, through a moisture detector 36 the construction of of which is well known in the art and need not be described in detail here. Such 2×4 inch lumber is preferred because of its availability and also its wide nailing surface. The 2×4 lumber 34 is placed on a moisture detection conveyor 38 for passage through the moisture detector 36, employing an electrical conductivity principle. Effective moisture detection is critical with respect to both the chords 12, 14 and web 16 to insure their proper gluing. If too much moisture is present, improper or insufficient initial curing will result. The lumber pieces, i.e. the 2×4 inch random lengths and the random web lengths, that have over the specified moisture content, are automatically marked and removed manually from the production line for later use when the moisture contents are within the satisfactory range.

Staging Area for 2×4 Lumber Pieces to be Joined to Create an Endless Chord

In order ultimately to obtain varying lengths of wooden joists 10, the standard length 2×4's are finger joined together to obtain long lengths, which are later cut to a desired length of specified wooden I-joists. However, in the overall production, a first step in preparing finger joints is obtaining the desired length of random 2×4 lumber. After the 2×4's 34 are passed through the moisture detector 36 the moisture detector conveyor 38 moves the 2×4's 34 to the operator holding area 40. At this locale, an operator manually places five 2×4 inch lengths of lumber, as shown in FIG. 6, parallel and adjacent to one another on a turntable conveyor 42 with the two inch dimension up as illustrated in FIGS. 6 and 7. Then the operator moves the five members against a movable roller stop 44, thereby placing the advanced 2×4 inch lumber ends in an even transfer position to begin the finger-cutting process. While these 2×4 inch lumber pieces are aligned by the roller stop 44, a hydraulic press 46 is operated to securely hold them in place on and against the turntable conveyor 42. The hydraulic press 46 and the end of the turntable conveyor 42 are so positioned that the 2×4 lumber pieces 34 extend out over the end of the turntable conveyor 42 and hydraulic press 46. Then a motor 66 causes conveyor 42 to move laterally, thereby causing the aligned 2×4 lumber ends to pass through the trim saw 48. Thereafter these trimmed 2×4 lumber 34 ends are passed through a finger joint cutting head 50.

First End Finger Cutting of 2×4 Inch Lumber

As illustrated in FIGS. 11 and 12, the finger joint cutting head 50 in the preferred embodiment, cuts several fingers 52 as viewed across the four inch width of the conventional 2×4 inch lumber 34. By so cutting these fingers in respect to the four inch width of the 2×4 lumber 34 rather than in respect to the two inch thickness, a greater and more effective number of fingers 52 may be cut, and a better joint is achieved later between the endwise affixed 2×4 lumber 34 pieces, as so trimmed and cut to form the chords 12 and 14 at many selectable lengths.

First End Gluing of Fingers of 2×4 Lumber

On the first pass, after the finger joint cutting head 50 has cut the fingers 52 in the 2×4's 34, glue is applied to these cut surfaces, the flow of the glue being activated as the 2×4 lumber 34 moves by the glue applicator head sensor 54, and it in turn activates the glue applicator head 56 applying glue to each of the fingers. Small nozzles 58 are placed along the length of the glue applicator head 56 and inject a stream of glue about the fingers 52, for the distance between the nozzles 58 equals the distance between the fingers 52.

Turning the 2×4 Inch Material End for End, Following First End Cutting of Fingers, and Gluing After the glue applicator head 56 has injected glue, at these ends of the 2×4 inch lumber 34, the hydraulic press 46 automatically releases, and kick ram 60 kicks the 2×4 lumber pieces 34 away from the hydraulic press onto the length of the turntable conveyor 42. Then the operator, as illustrated in FIG. 7, pivots the turntable conveyor 42 about its pivot 62, end for end, returning the turntable conveyor 42 into alignment with the edge of the turntable's support 64, while he operates motor 66 to automatically cause the hydraulic press 46 to return to its original position in alignment with the turntable conveyor 42.

After Turning End for End, the Second 2×4 Inch Lumber End is Trimmed and Fingers are Selectively Made and Glued With the turntable conveyor having been pivoted end for end, the other, i.e. opposite, 2×4 inch lumber 34 ends are now facing against roller stop 44, and they are to be held by the hydraulic press 46. The operator again moves the 2×4 inch lumber pieces, which are parallel and adjacent to one another, towards the roller stop 44 down the turntable conveyor 42 to prepare for the second cycle of trimming and finger cutting similar to the first cuttings. Once again as the 2×4 inch lumber pieces 34 are aligned by the roller stop 44, the hydraulic press secures the 2×4's in place against the turntable conveyor 42.

Also once again the motor 66 powers the turntable conveyor 42 transversely at right angle towards the trim saw 48, where the 2×4 inch lumber ends are trimmed. However, now on the second cycle, the vertical finger joint cutting head 50 is first automatically adjusted in height by using an adjustment mechanism, so the cutting head 50 produces a perfect mating of the fingers 52 cut in the ends of the 2×4 inch lumber 34 during the first cycle with fingers 52 cut in the second cycle. Again, the glue applicator head 56 automatically applies glue to the fingers 52. The double spreading of glue on both the first cycle and second cycle cut surfaces assures consistency of the spreading of the glue.

Ink Marking One End of Each Trimmed, Fingered, and Glued 2×4 Inch Lumber Piece After passing through the glue applicator head 56, during the second cycle only, one end of the 2×4 inch lumber pieces are marked by inker 68, for detection at a later step in the process. Following this inking, the hydraulic press 46 automatically releases, and the ram 60 kicks the 2×4 inch lumber 34, so cut at each end, away from the hydraulic press 46 and part way down the length of turntable conveyor 42. At this stage of the second cycle, the turntable conveyor 42 moves directly back to its initial position without rotating end for end, and the 2×4 inch lumber pieces, so formed, are directed once again towards the roller stop 44. However, at the end of this second cycle, the roller stop 44 is lowered, allowing the 2×4 inch lumber 34 to proceed onto dead roll casing, which moves them to finger joint lay-up station 72.

Manual Finger Joint Mating

At the finger joint lay-up station 72, an operator manually lifts the 2×4 inch lumber 34, one by one, from dead roll casing and manually mates the 2×4 inch lumber pieces 34, by moving the fingers 52 of one piece 34 into the fingers 52 of the preceding piece 34. This manual mating is first done only roughly, as a secure fit is not then necessary. Since the finger joint cutting head 50 has previously cut the 2×4 inch lumber pieces 34 at alternate ends for mating heights, the operator conveniently mates the pieces of 2×4 inch lumber 34, so they form a continuous level, uniform 2×4 lumber material 74, which eventually becomes the chords 16 and 18. The continuous manually mated 2×4 inch lumber 74 is driven on a conveyor 76, towards a glue curing mechanism 78 by power rollers 80.

Mechanical Completion of Finger Joint and Glue Curing by High Energy Radio Frequency The driving power of the power rollers 80 is controlled by a glue curing mechanism sensor 82, which in turn is triggered by the respective ink marks on the respective 2×4 inch lumber 34, which were previously applied by the inker 68 at the conclusion of the second cycle of the turntable conveyor 42. Thus, the continuous 2×4 inch finger jointed lumber 74 is fed through the glue curing mechanism 78 until the ink mark found on each 2×4 inch lumber piece 34 is sensed by the glue curing mechanism sensor 82, whereupon the conveyor stops and the glue curing procedure begins.

As illustrated in FIGS. 13 and 14, once the ink mark, often a stripe, is sensed by the glue curing mechanism sensor 82, the forward clamp 84 is brought into position clamping the continuous 2×4 finger jointed lumber 74 in a set position. This forward clamp 84, when clamped, is forward of the ink stripe and also the manually mated joint 86. Contemporaneously with the closing of the forward clamp 84, the rear clamp 88 is also brought into position clamping the continuous 2×4 finger jointed lumber 74. This rear clamp 88 is located to the rear of the ink mark and also the manually mated joint 86.

Once both the forward and rear clamps are set in position, a force is created mechanically or pneumatically, such as by using air bags 90 to bear on the lengthwise interfacing 2×4 inch lumber pieces 34 forcing them towards each other and thoroughly intermating the respective glue coated fingers 52, to finally create the continuous 2×4 finger jointed lumber 74. In the preferred embodiment, this lengthwise interfacing is accomplished, while the forward clamp 84 continues to hold in its initial set position, yet the rear clamp 88 is given the capability to thrust forward via the force created, preferably by using pneumatic air bags 90. During actual production, it is important to remember, that a short time has elapsed since the injection of glue on the surfaces of all of the fingers 52 and thus the glue has not begun to harden.

After this lengthwise compression of the previously manually mated joint 86, as is illustrated in FIG. 12, this then compressed mated joint 86 is held by an electrode clamp 92, which, through its conducting electrodes, directs high energy radio frequency for a designated time through the joint 86 to cure the glue, thereby finally securing the joint 86. The construction of the electrode clamp 92 is well known in the art and need not be described in detail here.

The finger-jointed lumber is held down by hold down wheels 101.

Cutting of Continuous 2×4 Lumber to Selectable, Specified Chord Lengths

After this curing the continuous interlocked 2×4 inch finger jointed lumber 74 is released and then propelled to and on a length determination table 94, until a leading portion thereof comes into contact with table stop 96, selectively positioned along the length determination table 94. Thus, an operator may determine the exact length that is then being specified for the chords 12 and 14 of the wooden I-joists 10 then being manufactured. The table stop 96 is sensitized to be responsive upon the contact of the leading portion of the 2×4 inch finger jointed lumber 74, first, to signal the drive rollers 98 to cease, and next to signal the chop saw 100 to cut the multi-finger jointed 2×4 inch lumber 74 to the predetermined length, then and thereafter designated as a chord 102.

First Cutting of Grooves in the Chord Lengths of 2×4 Inch Lumber

Upon being cut, each chord 102 is swept onto a chord transfer 104, which advances the chord to a groove cutter staging area 106, for eventual progress through a groove cutter 108, commencing, as a groove cutter conveyor 110 propels chord 102 towards groove cutter 108. The groove cutter 108 has two cutter heads 112 and 114. The chords 102 are propelled by drive wheel 115 and guided by guide wheels 116, preferably four, which are capable of being positioned to alternately direct the chords 102 to either the groove cutter head 112 or groove cutter head 114.

Shifting of Position of Drive Wheels for Alternate Cutting of Grooves in the Chord Lengths In the preferred embodiment, in a preferred sequence, the drive wheel 115 and guide wheels 116 first direct a chord 102, which is to become the top chord 12 into alignment with groove cutter head 112, whereupon the chord 102 through the cutter head 112 cutting, often by routing, is formed with a groove 17 throughout the entire length of the chord 102 to create top chord 12. After the chord 12 passes through the cutter head 112, it continues on to groove cutter outfeed table 118. Then the guide wheels 116 are automatically repositioned to direct the next chord 102 into alignment with cutter head 114, thereby causing cutter head 114 to cut groove 18 along the length of the chord 102, to create bottom chord 14. The chords are held in horizontal position by various hold down wheels 120.

Top and Bottom Grooves are Cut to Become Mirror Images of the Other

Cutter heads 112 and 114 are designed to cut the grooves, so that the alternating chords 12, 14 are set with their grooved sides facing one another, the grooves being mirror images of one another. This alternate cutting was made possible by the alternative positioning of the guide wheels 116, in relation to the cutter heads 112 and 114 to produce alternating chords with these grooves which are the mirror images of each other as set forth in FIG. 19.

Separation and Orientation of Top and Bottom Chords

After the chord 102 passes through the groove cutter 108, hold down wheel 120 forces chord 102 down upon groove cutter outfeed table 118. The forcing of the chord 102 upon the groove cutter outfeed table 118 is noted by chord sweep sensor 122.

Figure 20:
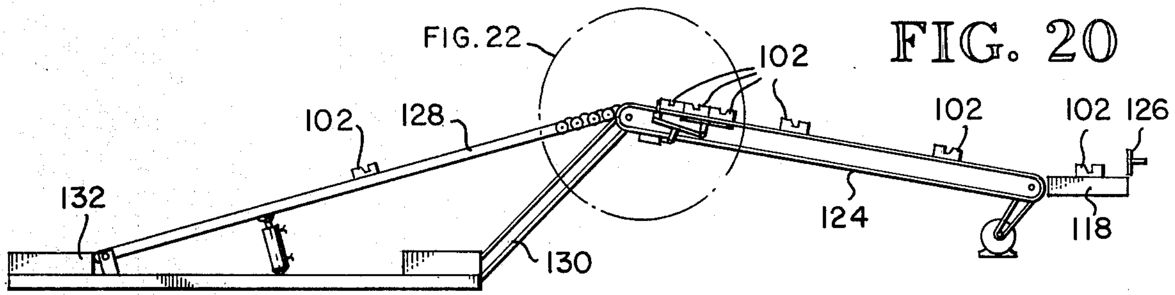
FIG. 20 is a schematic side view of the cross transfer mechanism with a movable slide and a stationary slide, which selects, segregates, orientates, and spaces, mated pairs of grooved chords, i.e. the top and bottom chords.
Figure 21:
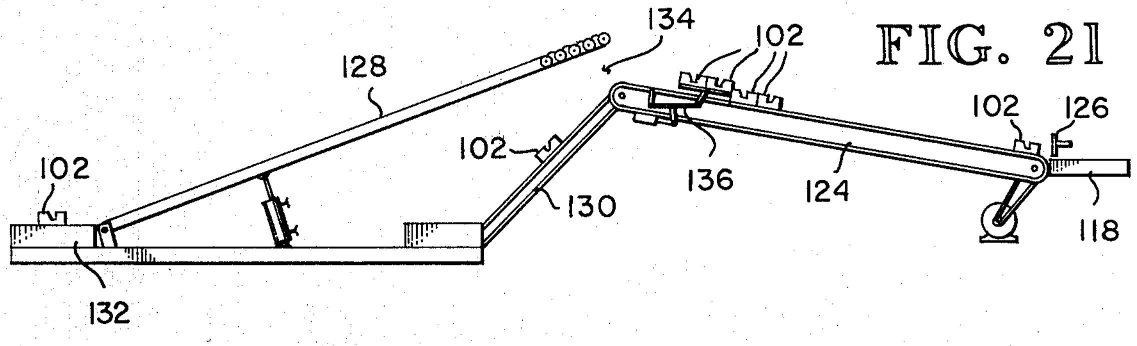
FIG. 21 is a schematic side view of the cross transfer mechanism with the movable slide in an open position.
Figure 22:
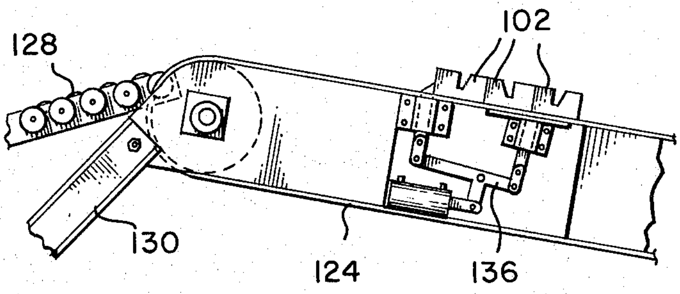
FIG. 22 is a detailed side view of the chord delivery regulator which is positioned near the meeting of the conveyor ramp and the movable slide.

Thus, when a chord 12 or 14 is entirely upon the groove cutter outfeed table 118 and has been so noted by the chord sweep sensor 122, it is swept to a conveyor ramp 124 by chord sweep arms 126. Upon reaching the top of the conveyor ramp 124, the chord 102 depending on its groove formation on command by an operator passes down either a movable slide 128 or a stationary slide 130 as illustrated in FIGS. 20, 21 and 22. When a top chord 12 reaches the top of the conveyor ramp 124, the operator keeps the movable slide 128 in the closed position, and the top chord 12 passes down over the movable slide 128 to the chord opposing table 132.

After this top chord 12 reaches chord opposing table 132, the movable slide 128 automatically moves to an open position 134 as illustrated in FIG. 21. Thus, as the bottom chord 14 reaches the top of the conveyor ramp 124, because the movable slide 128 is in the open position, it, therefore, passes down stationary slide 130 to the chord opposing table 132, opposite and spaced from the top chord 12. The grooved sides of these chords 12 and 14, are then positioned facing one another, with their grooves being the mirror images of one another. Thus, both the straight surfaces 28 of the facing grooves are on the lower sides, and both the tapered or slanted surfaces 30 of the facing grooves are on the upper sides.

As illustrated in FIG. 22, the progression of the chords 102 are regulated by chord delivery regulator 136. The chord delivery regulator impedes the progress of the chords 102 as they move up the conveyor ramp 124. The chord delivery regulator 136 is manually operated and when released, a single chord is allowed to proceed up the conveyor ramp 124 and down either the movable or stationary slide 128 or 130.

Figure 23:
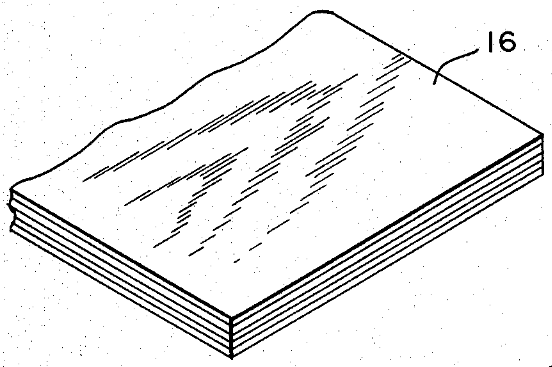
FIG. 23 is a perspective view of web plywood material before its edges have been trimmed and cut to their respective tapered and leveled surfaces.
Figure 24:
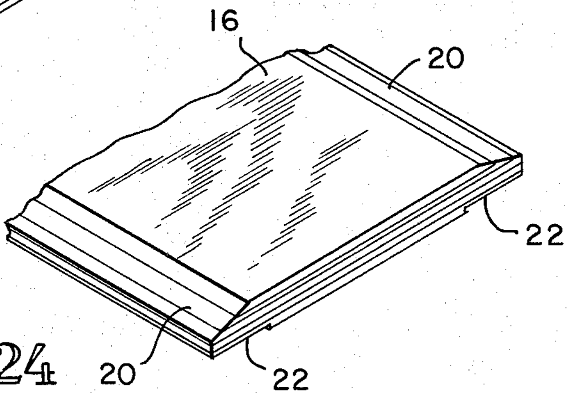
FIG. 24 is a perspective view of web plywood material after its edges have been trimmed and cut.

Commencing the Manufacture of the Webs of the I-Joists, Their Trimming and Beveling FIG. 23 illustrates web material 16, preferably ½ inch plywood, prior to undergoing a bevelling operation, as schematically illustrated in FIGS. 25 and 26, which commences as a plywood feeder 138 introduced individual plywood web pieces 16, pre-cut to an approximate width, onto a web support drive roll 140. Then the individual web pieces 16, while on the web support drive roll 140, are passed by the straight cutting heads 150, 152, to form the top and bottom smooth surfaces 22, as illustrated in FIGS. 24, 25, and 27. Thereafter, the web pieces 16 are moved past bevel forming heads 146 and 148 creating the tapers 20 on either side of the webs 16, i.e. top and bottom of the webs 16, as shown in FIGS. 24, 25, and 28. Also, as illustrated in FIG. 28, the forming heads 146 and 148 are equipped with trim saw portions which exactly trim the webs 16 to the precise width specified for a particular production run.

The Crowding and Abutting of the Web Pieces

After the web 16 passes through the bevel cutting heads the web 16 continues along web support drive roll 140, where the constant drive from the rear causes the successively conveyed web pieces to abut one another, forming a continuous web material 16.

The Abutting Web Pieces are Moved Between Chords, and Then the Chords are Moved Toward One Another to Interfit With the Web As illustrated in FIG. 29, the crowded continuous web material 16 is soon, via conveyors, surrounded by converging chords 12 and 14, being driven along chord introduction conveyors 154 and 156. During their converging movements, the chords 12 and 14 are advanced to the chord converging guides 158 and 160, which move them towards two sets of inner drive wheels 162 and 164, assisted by chord rams 166 and 168 and two sets of outer drive wheels 170 and 172, as they are conveyed and propelled forward. The chord rams 166 and 168 are positioned and operated to adjustably move the converging guides 158 and 160 to curve the path of the advancing chords 12 and 14 towards the web 16.

Gluing of the Chords to the Web

Figure 32:
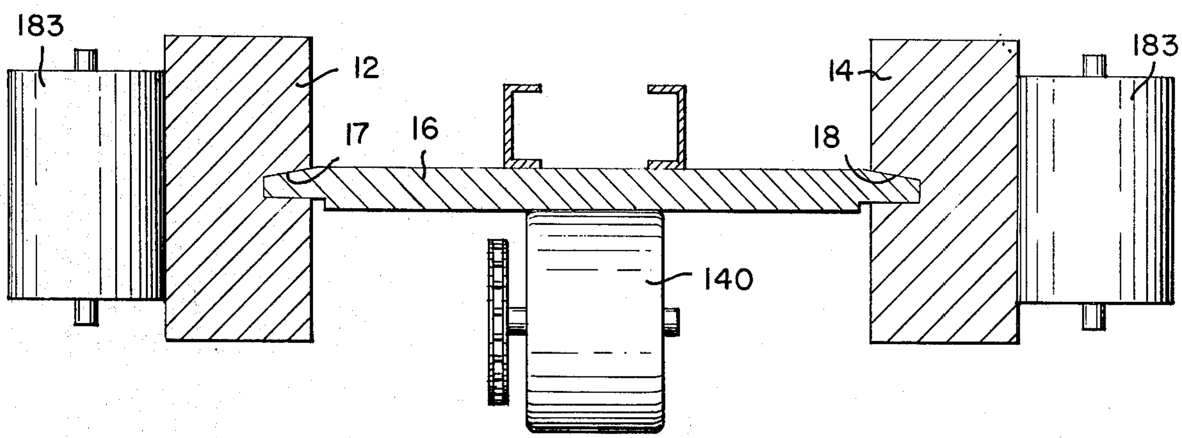
FIG. 32 is a cross-sectional view of an I-joist passing over the web conveyor and between the pressure wheel set.

Opposite these outer drive wheel sets 170, 172, there are glue nozzles 174 and 176 as illustrated in FIGS. 29 and 30, which inject glue into the respective grooves of chords 12 and 14. Also glue nozzles 178 and 180 apply due to both the straight and slanted cut edges of the web 16, with adequate glue being applied at all these places to form excellent bonds between the web 16 and chords 12 and 14. Following the application of the glue, the chords 12 and 14 are conveyed by pressure wheel sets 182 and 183 as set forth in FIG. 32 which apply forces on the back of the chords 12 and 14, causing their grooves 17 and 18 to be moved onto the web 16. The top and bottom chords 12 and 14 so secured to web 16 have then essentially formed an I-joist 10, as shown in FIGS. 2, 29, 36 and 37.

The Continuing, Repeating Movements of the Chord Rams

After this gluing, movement, and securement the chord rams 166 and 168 retract the the immediate I-joist 10 then advances. Thereafter the following chords advance into their position against the chord converging guides 158 and 160. Then the chord rams 166, 168, which were in their retracted positions, are once against activated to direct the follwing pair of chords inwardly against the inner drive wheel sets 162 and 164. This repeating procedure essentially continues indefinitely during operation of the entire product line, thereby always directing follow on chords towards the web.

The continuity of the arrival of follow on chords 12, 14, is further insured as the outer drive wheels 170, 172 to tend to move the follow on chords 12, 14, more quickly than the preceding chords 12, 14 being moved through the curing mechanism 184.

The Glue Curing by a Mechanism Inclusive of High Energy Radio Frequency Equipment Apparatus After the chords 12 and 14 and web 16 have been fitted together essentially as an I-joist 10, then joist drive unit 185 advances them through the radio frequency glue curing mechanism 184.

Figure 33:
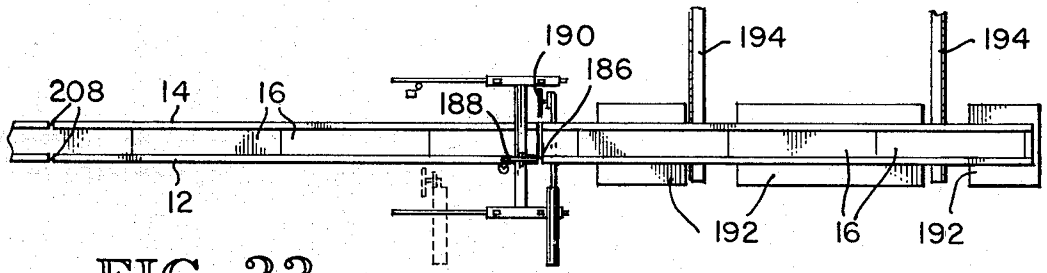
FIG. 33 is a schematic overhead view of the web cutting mechanism triggered to cut the web to match the chord lengths and thereby complete each I-joist.

Cutting of the Continuous Web to Match the Respective Chord Lengths to Create the I-Joists Although there is separation or gap 208 between the preceding and successive respective top and bottom chords 12, 14, as shown in FIG. 33 there is no gap between the preceding and succeding webs 16, the web having been continuously formed. Therefore the web must be cut into specified web lengths 16 at the gaps 208 between the chords. In respect to the size of the gaps the space between successive chords is adjusted by utilizing a delay mechanism, in reference to the conveying of the chords, to arrive at a spacing, i.e. gap 186 which leaves little wasted material upon cutting the web material 16.

Figure 34:
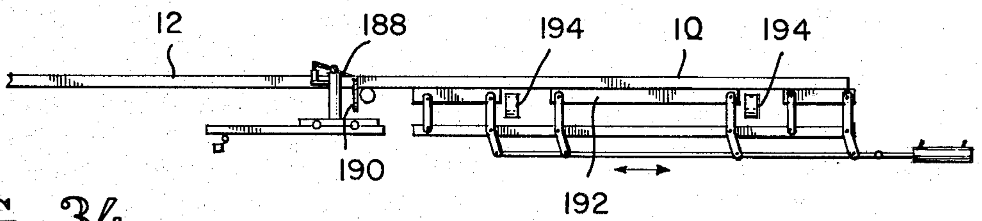
FIG. 34 is a side view of the web cutting mechanism and the chord collection table which receives the I-joists after they have passed through the web cutting mechanism.
Figure 35:
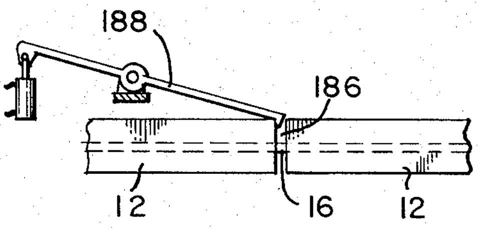
FIG. 35 is a side view of the sensor controlled spring mounted feeler bar.

As a first stop to prepare for this cutting, a sensor controlled spring mounted feeler bar 188, illustrated in FIGS. 33, 34 and 35, slides along the top chord 12, until it falls into the gap 186 and is pulled forward. This movement of the feeler bar 188, which is mechanically connected to web cutting saw 190, pulls the web cutting saw 190 across the web 16 at the gap 186, as the web cutting saw mounting travels at the same production line speed as the gap 186, thereby cutting the web 16 with precision. Thereafter, when the web cutting saw 190 has finished cutting the web 16, the feeler bar springs free and returns to its original position to again ride along the succeeding chord, until locating the next gap 186, to commence this web cutting cycle once again.

Testing the Completed I-Joist

After the web 16 is cut to length, thereby completing the I-joist 10, it passes to the cured collection table 192, which thereafter lowers this completed I-joist 10 onto conveyor 194 for transfer to a test staging area 196. Once reaching this test staging area 196, the I-joist 10 is then advanced along a test placement conveyor 198, to the test position equipment 200. Then the test position equipment 200 is operated to apply a single point load by a point load cylinder 202 to the I-joist 10 against test member bearing supports 204 and 206, to insure the proper strength is present for both the materials and glue bonds between the web 16 and chords 12, 14. This immediate testing of the completed I-joists 10 fully completes their manufacture. Any of the I-joists 10, not passing this inspection strength test are immediately removed from the production line. This constant testing allows for immediate inspection and adjustment or repair of production equipment to eliminate any future problems. After testing the approved I-joists 10 proceed along test conveyor 208 to an unloading table 210, for follow on distribution to predelivery customer areas, or warehouse areas.

A number of power sources are designated throughout the drawings to desigate the power sources which drive the various machines.

We claim:

1. A complete production line of a wood I-joist manufacturing apparatus using lumber from random length supplies for the chords and plywood from random length supplies for the web, to make I-joists of many specified lengths and depths, inclusive of their immediate glue joint curing and strength testing, comprising:
   (a) a mechanism for grouping selected near alike random lengths of lumber of like cross-section, inclusive of a stop to abut one end of each, a saw to trim these abutted ends, a finger cutter to form these trim edges, a glue applicator to glue these formed ends, a pivotal support to swing the group of random lengths to prepare the opposite ends using again, the stop, the trim saw, the finger cutter and glue applicator;
   (b) a mechanism for receiving and crowding the now alike lengths of lumber to complete their finger joining into an essentially continuous length of lumber for chords, inclusive of a glue joint curer;
   (c) a mechanism to cut the continuous length of chord lumber into selectable, then being specified, lengths of chord lumber;
   (d) a mechanism for cutting grooves in the lengths of chord lumber, alternatively forming grooves, each of which is a mirror image of the other, one length of chord lumber so grooved to become the bottom chord;
   (e) a mechanism to receive random lengths of like thickness of pregrouped plywood, saws to trim these random lengths to a specified width, saws to cut inwardly of each trimmed width edge along one surface of the plywood, saws to cut inwardly of each trimmed width edge along the other surface of the plywood, and a crowder to create an endless web of these formed plywood pieces;
   (f) a mechanism having conveyors for both the grooved chord lumber and the endless web plywood to converge the chord lumber into contact with web plywood, glue applicators to spread glue in the grooves and on the formed edges of the web plywood, just prior to their contact, and glue joint curers;
   (g) a mechanism for continuing the conveying of the joined chord lumber and endless web, inclusive of a sensor, trigger, and actuator to locate a slight space between chord lengths, a traveling cut off saw moved across the web by the actuator to cut the web to match the chord lengths, thereby creating the I-joists; and
   (h) a mechanism to immediately test the overall strength of each I-joist.

2. A complete production line of wood I-joist manufacturing apparatus, as claimed in claim 1, wherein the glue joint curers utilize high energy radio frequency.

3. A complete production line of wood I-joist manufacturing apparatus, as claimed in claim 1, wherein the grooves in the chord lumber, and the cut surfaces of the webs are formed in cross-section to have on one set of sides interfitting surfaces that are parallel to the depth of the web and on the other set of sides interfitting surfaces that are tapered relative to the depth of the web to create joints easily interfitted while maintaining the chords perpendicular to the web of the I-joist.

4. A complete product line of a wood-joist manufacturing apparatus, as claimed in claim 1, comprising, in addition, a mechanism for receiving the chords cut with mirror image grooves, inclusive of pivotal guides to direct chords with one mirror image groove to a separate locale, and non pivotal guides, cleared upon pivoting of the pivotal guides, to direct chords with the other mirror image groove to another separate locale of their entry to the mechanism converging the chords about the edges of the web.

5. A complete product line of a wood-joist manufacturing apparatus, as claimed in claim 1, wherein the mechanism for cutting grooves in the chord length lumber, comprises a set of one conveying track and a groove cutter to create one mirror image groove, and a second set of one conveying track and a groove cutter to create the other mirror image groove, thereby creating both the top and bottom chords.

6. A complete product line of a wood-joist manufacturing apparatus, as claimed in claim 1, wherein the mechanism to immediately test the overall strength of each I-joist, includes end supports at the ends of the lower chord of the I-joist and a loading force mechanism at the center of the upper chord of the I-joist, to create loads anticipated when the I-joist is subsequently installed in a building.

7. A complete product line of wood-joist manufacturing apparatus, as claimed in claim 1, wherein the mechanism for conveying and converging the chords with the web plywood, in addition, comprises:

(a) a drive wheel for advancing a top chord;

(b) a second drive wheel for advancing a bottom chord;

(c) a chord ram positioned for curving the top chord towards the then continuous web plywood;

(d) a second chord ram positioned for curving the bottom chord towards the then continuous web plywood;

(e) an outer drive wheel which forces the top chord into abutment with the then continuous web plywood; and (f) a second outer drive wheel which forces the bottom chord into abutment with the then continuous web plywood.

8. A complete product line of a wood I-joist manufacturing apparatus, as claimed in claim 1, wherein the mechanism for cutting the grooves in the lengths of chord lumber, has cutter heads to form a groove approximately ⅜ inch in depth, with an inner base width to receive an inserted web edge, one side of the groove being formed at right angles and the opposite side being formed on a 10° taper.

9. A complete product line of a wood I-joist manufacturing apparatus, as claimed in claim 1, wherein the mechanism to receive random lengths of pregrouped plywood, has, instead of a saw to trim them to a width and a saw to trim them along one surface, a bevel head cutter which trims the leading edge while also trimming one surface.

10. A production line method of making wood I-joists using lumber of like cross-section from random length supplies for the chords and plywood of like thickness from random length supplies of approximate width for the web, to make I-joists of many specified lengths and depths, inclusive of their immediate glue joint curing and strength testing, comprising:

(a) grouping together near alike random lengths of lumber of like cross-section with at least one end of each adjacent the ends of all the others;

(b) precisely trimming these adjacent ends of the random lengths of lumber;

(c) forming finger ends from these precisely trimmed ends of the random lengths of lumber;

(d) applying glue to these finger ends;

(e) rotating this grouping of lengths of lumber of like cross-section, end for end;

(f) precisely trimming the opposite adjacent ends of the originally random lengths of lumber;

(g) forming complementary finger ends from these opposite precisely trimmed ends;

(h) applying glue to these opposite complementary finger ends;

(i) interfitting the complementary formed finger ends to create a continuous length of lumber for chords;

(j) curing the glued interfitted complementary formed finger ends using high energy radio frequency;

(k) cutting the otherwise continuous length of lumber into predetermined lengths for chords;

(l) forming lengthwise grooves in the respective selectable length chord lumber to create chords;

(m) guiding the selectable length chords from respective spaced locales toward one another with their grooves facing one another;

(n) grouping random lengths of plywood end to end as a continuous web;

(o) precisely trimming these random lengths of plywood to a selectable web width;

(p) trimming the top and bottom surfaces along the edges of the trimmed width of the plywood grouped as a continuous web;

(q) guiding the trimmed plywood continuous web between the guided predetermined length chords being guided toward one another;

(r) applying glue both to the grooves in the predetermined length chords and to the trimmed edges and surfaces of the continuous plywood web;

(s) continuing the guiding of both predetermined length chords and also the continuous plywood web into contact, thereby interfitting them;

(t) curing the glued interfitted joints of the predetermined length chords and the continuous plywood web;

(u) cutting the continuous web to match the predetermined length chords, thereby creating the I-joists; and (v) testing the I-joists for overall strength.

11. A production line method of making wood I-joists using lumber of like cross-section from random length supplies for the chords and plywood of like thickness from random length supplies of approximate width for the web to make I-joists, as claimed in claim 10, wherein, in forming the lengthwise grooves in the predetermined length chord lumber to create the chords, alternate predetermined lengths of chord lumber are formed with mirror image grooves with each groove having a straight side and an opposite tapered side, the straight side cooperating with the mirror image straight side of an oppositely placed predetermined length of chord lumber to insure the ultimate perpendicularity of the assembled web and chords of the I-joist, and the tapered side cooperating with the mirror image tapered side of an oppositely placed predetermined length of chord lumber to insure the ultimate well guided interfitting of the web edges into the grooves of the chords of the I-joist, with the terminus of the web edges fitting into the terminus of bases of the grooves of the chords.

12. A production line method of making wood I-joists, as claimed in claim 10, wherein detecting the moisture content of the lumber and the plywood is initially undertaken, thereby passing on, through the production line method, the lumber and plywood having moisture at or below a prespecified level, and rejecting lumber and plywood from the production line method, having a moisture content in excess of this level, thereby assuring the gluing and glue curing will be undertaken in the presence of proper moisture, resulting in high quality glue-bonded joints throughout the I-joint.

13. A complete production line of a wood I-joist manufacturing apparatus, as claimed in claim 1, having at the outset moisture detection equipment to detect the moisture content of the lumber, thereafter passing on through the production line manufacturing apparatus only the lumber having a moisture content at or below a specified level and rejecting the lumber having a moisture content in excess of this level, thereby assuring high quality glue-bonded joints in the I-joist.

14. A complete production line of a wood I-joist manufacturing apparatus using lumber from random length supplies for the chords and plywood from random length supplies for the web, to make I-joists of many specified lengths and depths, inclusive of their immediate glue joint curing, comprising:

(a) a mechanism for grouping selected near alike random lengths of lumber of like cross-section, inclusive of a stop to abut one end of each, a saw to trim these abutted ends, a finger cutter to form these trimmed edges with fingers, a glue applicator to apply glue to the finger formed ends, a pivotal support to swing the group of random lengths to prepare their opposite ends with glue covered fingers using again, the stop, the trim saw, the finger cutter and glue applicator;

(b) a mechanism for receiving and crowding the now alike lengths of lumber to complete their finger joining into an essentially continuous length of lumber for chords, inclusive of a glue joint curer;

(c) a mechanism to cut the continuous length of chord lumber into selectable, then being specified, lengths of chord lumber;

(d) a mechanism for cutting grooves in the lengths of chord lumber, alternately forming grooves, each of which is a mirror image of the other, chords with one mirror image groove becoming the bottom chords, chords with the other mirror image groove becoming the top chords;

(e) a mechanism to receive random lengths of like thickness of pregrouped plywood, saws to trim these random lengths to a specified width, saws to cut inwardly of each trimmed width edge along one surface of the plywood, saws to cut inwardly of each trimmed width edge along the other surface of the plywood, and a crowder to create an endless web of these formed plywood pieces;

(f) a mechanism having conveyors for both the grooved chord lumber and the endless web plywood to converge the chord lumber into contact with the web plywood, glue applicators to spread glue in the grooves and on the formed edges of the web plywood, just prior to their contact, and glue joint curers; and (g) a mechanism for continuing the conveying of the joined chord lumber and endless web, inclusive of a device for locating the space between chord lengths and cutting the web to match chord lengths, thereby creating the I-joists.

15. A complete production line of wood I-joist manufacturing apparatus, as claimed in claim 14, comprising, in addition, a mechanism to immediately test the overall strength of each I-joist.

16. A complete production line of wood I-joist manufacturing apparatus, as claimed in claim 4, wherein the device for locating the space between chord lengths and cutting the web to match chord lengths, includes a sensor, a trigger, and an actuator to locate a slight space between chord lengths, and a traveling cut off saw which is moved across the web by the actuator to cut the web to match the chord lengths.

17. A production line method of making wood I-joists using lumber of like cross-section from random length supplies for the chords and plywood of like thickness from random length supplies of approximate width for the web, to make I-joists of many specified lengths and depths, inclusive of their immediate glue joint curing, comprising:

(a) grouping together near alike random lengths of lumber of like cross-section with at least one end of each adjacent the ends of all the others;

(b) precisely trimming these adjacent ends of the random lengths of lumber;

(c) forming finger ends from these precisely trimmed ends of the random lengths of lumber;

(d) applying glue to these finger ends;

(e) rotating this grouping of lengths of lumber of like cross-section, end for end;

(f) precisely trimming the opposite adjacent ends of the originally random lengths of lumber;

(g) forming complementary finger ends from these opposite precisely trimmed ends;

(h) applying glue to these opposite complementary finger ends;

(i) interfitting the complementary formed finger ends to create a continuous length of lumber for chords;

(j) curing the glued interfitted complementary formed finger ends using high energy radio frequency;

(k) cutting the otherwise continuous length of lumber into predetermined lengths for chords;

(l) forming lengthwise grooves in the respective selectable length chord lumber to create chords;

(m) guiding the selectable length chords from respective spaced locales toward one another with their grooves facing one another;

(n) grouping random lengths of plywood end to end as a continuous web;

(o) precisely trimming these random lengths of plywood to a selectable web width;

(p) trimming the top and bottom surfaces along the edges of the trimmed width of the plywood grouped as a continuous web;

(q) guiding the trimmed plywood continuous web between the guided predetermined length chords being guided toward one another;

(r) applying glue both to the grooves in the predetermined length chords and to the trimmed edges and surfaces of the continuous plywood web;

(s) continuing the guiding of both predetermined length chords and also the continuous plywood web into contact, thereby interfitting them;

(t) curing the glued interfitted joints of the predetermined length chords and the continuous plywood web; and (u) cutting the continuous web to match the predetermined length chords, thereby creating the I-joists.

18. A production line method of making wood I-joists as claimed in claim 17, wherein, in forming the lengthwise grooves in the predetermined length chord lumber to create the chords, alternate predetermined lengths of chord lumber are formed with mirror image grooves with each groove having a straight side and an opposite tapered side, the straight side cooperating with the mirror image straight side of an oppositely placed predetermined length of chord lumber to insure the ulitmate perpendicularity of the assembled web and chords of the I-joist, and the tapered side cooperating with the mirror image tapered side of an oppositely placed predetermined length of chord lumber to insure the ultimate well guided interfitting of the web edges into the grooves of the chords of the I-joist, with the terminus of the web edges fitting into the terminus of bases of the grooves of the chords.

* * * * *